United States Patent [19]

Inouye et al.

[11] 3,978,396

[45] Aug. 31, 1976

[54] METHOD AND APPARATUS FOR MEASURING ELECTROMAGNETIC CONDUCTIVITY OF A MEDIUM AND FOR DETECTING ANOMALIES THEREIN

[75] Inventors: George T. Inouye, Palos Verdes; Saul Altshuler, Manhattan Beach, both of Calif.

[73] Assignee: TRW Inc., Redondo Beach, Calif.

[22] Filed: Nov. 6, 1968

[21] Appl. No.: 776,307

[52] U.S. Cl. ................................................ 324/6
[51] Int. Cl.² ........................................ G01V 3/10
[58] Field of Search .......................... 324/6, 7, 8; 340/15.5 TI, 16 P

[56] References Cited
UNITED STATES PATENTS

| | | | |
|---|---|---|---|
| 2,963,646 | 12/1960 | Hicks et al. | 340/15.5 |
| 3,021,481 | 2/1962 | Kalmus et al. | 340/16 |
| 3,090,910 | 5/1963 | Moran | 324/6 |
| 3,350,634 | 10/1967 | Hoehn | 324/6 |
| 3,412,323 | 11/1968 | Unterbereer et al. | 324/6 |

*Primary Examiner*—Maynard R. Wilbur
*Assistant Examiner*—T. M. Blum
*Attorney, Agent, or Firm*—Daniel T. Anderson; Edwin A. Oser; Jerry A. Dinardo

[57] ABSTRACT

There is disclosed a method and apparatus for measuring electromagnetic conductivity within a medium to thereby derive a measurement of the rate of propagation of a magnetic field therein. If one then measures the return time of a pulse transmitted in the medium when a conductivity anomaly is encountered which creates a reflection, a magnetic diffusion radar can be calibrated. This technique enables one to measure the conductivity of a propagation medium such as salt water, earth or the like for any desired purpose such as determining the salinity of sea water or river water. More particularly, however, this enables one to make such a measurement in order to provide an electromagnetic anomaly detector such as is used in metal locaters, mine detectors, and in geophysical prospecting or exploration. The technique disclosed herein uses a detector designed to operate in the conducting medium, that is, in the ocean underwater or underground and further uses magnetic fields from a pulse source rather than from a continuous sinusoidal electromagnetic signal. Suitable transmitting and receiving coils are provided to generate such pulsed magnetic fields and to detect reflections therefrom caused by anomalies in the conducting medium. The signals induced in the receiving coil by these reflections are processed to provide not merely an indication of the existance of the anomaly but also a measure of its distance from the measuring apparatus.

3 Claims, 17 Drawing Figures

George T. Inouye
Saul Altshuler
INVENTORS

George T. Inouye
Saul Altshuler
INVENTORS

METHOD AND APPARATUS FOR MEASURING ELECTROMAGNETIC CONDUCTIVITY OF A MEDIUM AND FOR DETECTING ANOMALIES THEREIN

BACKGROUND OF THE INVENTION

1. Field of the Invention

Electromagnetic anomaly detectors are used as metal locaters, mine detectors, and in geophysical prospecting or exploration. Generally, these devices have used sinusoidal continuous electromagnetic signals, that is to say, continuous wave techniques, detecting the change in the self-inductance of a single coil or the mutual inductance of a transmitting-receiving coil pair.

2. Description of the Prior Art

Such anomaly detectors are described in many standard textbooks and more recently have been described in an article entitled, "Electronic Metal Locaters," by D. E. Lancaster, published on page 39 of *Electronics World* for December, 1966.

SUMMARY OF THE INVENTION

The electromagnetic anomaly detector disclosed herein propagates a pulsed magnetic field within a conducting medium such as the ground or ocean water. The permeability and conductivity of the medium are first measured to provide a knowledge of the constants which occur in the equation describing the propagation of a magnetic field from a pulsed source. Solutions for this vector diffusion equation are used to establish a relationship between the time delay of the return of a reflection from an anomaly and the distance from the measuring point to the anomaly. It is thus found possible to provide what may be termed a magnetic field diffusion radar as a means of detecting the range as well as the presence of an anomaly such as a mine in sea water or a mineral deposit underground. Since the medium discontinuity exists as a change in the conductivity (which may be to either higher or lower conductivity values) as well as in the permeability, detection is not limited to ferro-magnetic mines or the like, but also includes metals and non-conductors such as wood or plastic.

DESCRIPTION OF THE PREFERRED EMBODIMENT

I. Theoretical Background

A. General

Figure 1:
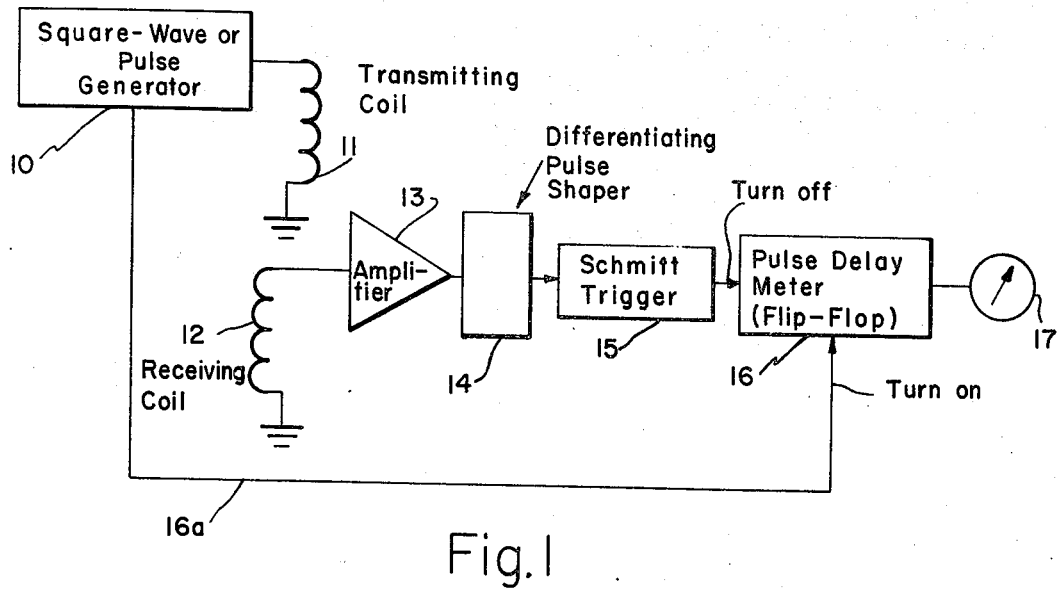
FIG. 1 is a block diagram of apparatus used to measure the conductivity of the medium through which propagation is desired.

Non-static magnetic fields in a conducting medium do not propagate "instantly", but rather are controlled by eddy currents flowing in the medium, which may be described as a diffusion process. The criterion for the applicability of the diffusion equation is derived from Maxwell's equations wherein conventional notation is used as follows:

$$\nabla \times E = -\dot{B}, \quad D = \epsilon E$$
$$\nabla \times H = J + \dot{D}, \quad B = \mu H \quad (1)$$
$$\nabla \cdot B = 0, \quad J = \sigma E$$
$$\nabla \cdot D = \rho$$
$$\nabla^2 H = \mu\epsilon \ddot{H} + \mu\sigma \dot{H} \quad (2)$$
$$\nabla^2 H = \mu\sigma \dot{H} \text{ for } \tau >> \epsilon/\sigma. \quad (3)$$

Equation (3) is the diffusion equation with the diffusion coefficient or diffusivity, D, defined by $$D = \frac{1}{\mu\sigma}. \quad (4)$$

The characteristics of some conductive media are tabulated below.

TABLE I

| Material | Conductivity $\sigma$ (mhos/m) | Dielectric Constant $\epsilon$ (farads/m) | Time Constant $\tau = \epsilon/\sigma$ (sec) | Diffusivity $D = 1/\mu\sigma$ (m²/sec) | Skin Depth at 1 kc/s $x_s = \sqrt{\frac{2}{\omega\mu\sigma}}$ (m) |
|---|---|---|---|---|---|
| Copper | $6 \times 10^7$ | $8.9 \times 10^{-12}$ | $1.5 \times 10^{-19}$ | $1.3 \times 10^{-2}$ | .002 |
| Mercury | $1 \times 10^6$ | $3.9 \times 10^{-12}$ | $8.9 \times 10^{-18}$ | 0.80 | .016 |
| Sea Water | 5 | $81 \times 8.9 \times 10^{-12}$ | $1.4 \times 10^{-10}$ | $1.6 \times 10^5$ | 7.1 |
| Pastoral Land | $5 \times 10^{-3}$ | $13 \times 8.9 \times 10^{-12}$ | $2.3 \times 10^{-8}$ | $1.6 \times 10^8$ | 230 |
| Distilled Water | $10^{-4}$ | $81 \times 8.9 \times 10^{-12}$ | $7.2 \times 10^{-6}$ | $10^{10}$ | 3180 |

The time constant, $\tau$, is well under a microsecond for all of the above media except for distilled water. This means that the diffusion equation is valid for effects having time scales longer than a microsecond, or frequency components under a megacycle/second. (This applies to the media listed in Table I except for distilled water.)

Solutions of the diffusion equation are available in standard textbooks in connection with heat flow problems, and in the one-dimensional case, with the propagation of electric signals in a long unloaded (no inductance) cable.

B. A One-Dimensional Solution

A simple solution to the diffusion equation is obtained in the one-dimensional case of a semi-infinite medium with a step-function change in the magnetic field at the origin:

$$\frac{\partial H}{\partial t} = D \frac{\partial^2 H}{\partial x^2}, \quad (5)$$

the boundary conditions are:

$$H(x, 0) = 0 \text{ for all } x \text{ at } t = 0$$
$$H(0, t) = H_o \text{ at } x = 0 \text{ for all } t. \quad (6)$$

The solution is $$H(x, t) = H_o \left[ 1 - erf \left( \frac{x}{2} \sqrt{\frac{1}{Dt}} \right) \right], \quad (7)$$

where the error function, $$erf\, x = \frac{2}{\sqrt{\pi}} \int_o^x e^{-y^2} dy.$$

If we let $$\tau = \frac{x^2}{4D} \text{ and } \theta = \frac{t}{\tau} \quad (8)$$

then $$H(x, t) = H_o (1 - erf\, \theta^{-1/2}). \quad (9)$$

Figure 6:
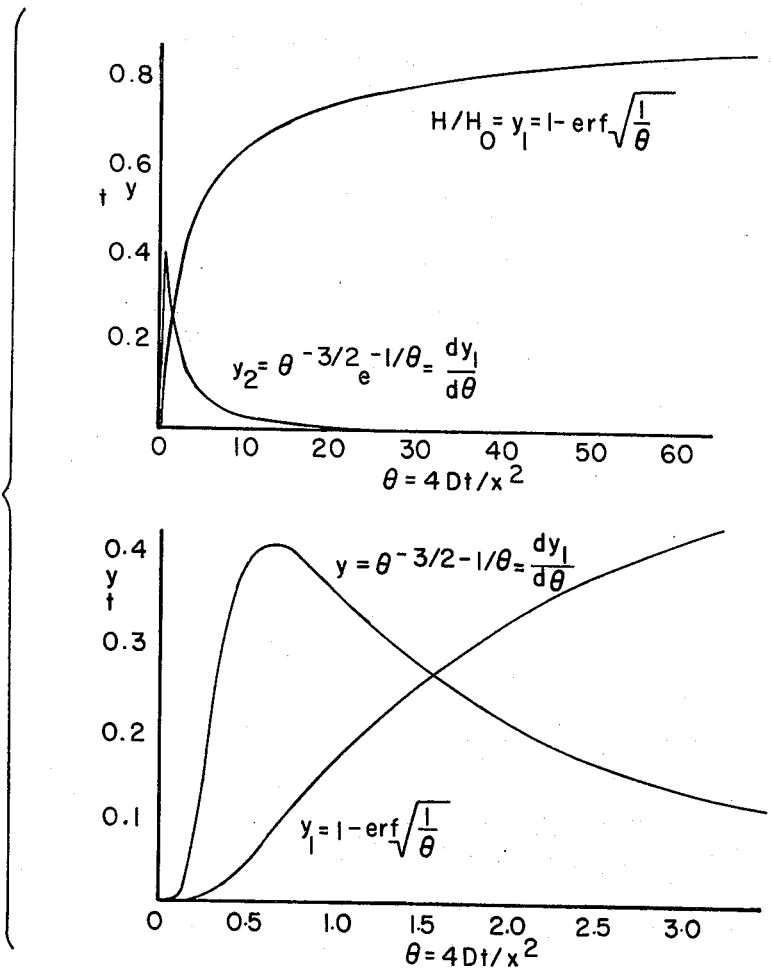
FIG. 6 is a pair of graphs plotting solutions to the one dimensional diffusion equation discussed in connection with the mode of operation of the apparatus.

At any given distance, $x$, the shape of the waveform of $H$ vs $t$ is identical to that at any other value of $x$ provided that the time scale is divided by $x^2$. The function, $H/H_o$, is plotted vs $\theta$ in FIG. 6.

C. Time Derivative of the One-Dimensional Solution

If a search coil or induction magnetometer is used to detect the buildup of the magnetic field, the slope of the $H$ vs $t$ waveform, or $\dot{H}$ is measured. The partial time derivative of equation (9) gives $$\dot{H} = \frac{\partial H}{\partial t} = H_o \left( \frac{1}{2} \sqrt{\frac{x^2}{\pi D}} t^{-3/2} e^{-\frac{x^2}{4Dt}} \right) \quad (10)$$

or $$\dot{H} = H_o \pi^{-1/2} \tau^{-1} \theta^{-3/2} e^{-1/\theta} \quad (11)$$

where $\tau$ and $\theta$ are defined in equation (8).
At any given distance, $x$, $\dot{H}$ has a maximum at $$\theta = 2/3 \text{ or } t_{max} = 2/3\, \tau = x^2/6D. \quad (12)$$

This maximum amplitude is $$\dot{H}_{max} = H_o \pi^{-1/2} (x^2/4d)^{-1} \cdot 0.410. \quad (13)$$

Again the waveshape of $\dot{H}$ vs time is invariant with time, provided the time scale is normalized by dividing $t$ by $x^2$. The time delay, from the start of the step function to the $\dot{H}$ maximum, $t_{max}$, varies as the square of $x$. The function, $\theta^{-3/2} e^{-1/\theta}$, which is proportional to $\dot{H}/H_o$, is also plotted in FIG. 6. At the time of maximum $\dot{H}$:

$$H = H_o (1 - erf\, \theta_m^{-1/2}) = 0.083\, H_o. \quad (14)$$

The field has reached 8.3% of its final value at this time. Although the final value of H in this one-dimensional case is invariant with distance, the value of $\dot{H}_{max}$ drops off as $x^{-2}$.

D. Impulse Function Boundary Condition

If the step function boundary condition of equation (6) is terminated at time $\theta_o$, the field is given by $$H/H_o = 1 - erf\, \theta^{-1/2} - [1 - erf\, (\theta - \theta_o)^{-1/2}]$$
$$= erf\, (\theta - \theta_o)^{-1/2} - erf\, \theta^{-1/2} \quad (15)$$

for $\theta > \theta_o$.

For $\theta < \theta_o$, the original solution, equation (7), applies. Now as $\theta - \theta_o$ approaches zero, the solution is again given by the partial time derivative, equations (10) or (11):

$$H = (H_o \cdot \delta t) \left( \frac{1}{2} \sqrt{\frac{x^2}{\pi D}} t^{-3/2} e^{-\frac{x^2}{4Dt}} \right) = H_I \left( \frac{\dot{H}_{step}}{H_o} \right) \quad (16)$$

where $H_o \delta t$ is the impulse function, $H_I$:

$$H_I = H_o \cdot \delta t. \quad (17)$$

Thus, the time variation of the magnetic field at any given distance, $x$, is identical to the signal due to a step function source picked up by an induction magnetometer.

In considering a practical apparatus for detecting the diffusion process time delay, the impulse function is far more economical of transmitter power than a step function since the duty cycle is much smaller. It is only required that the "on" time, $\delta t$, be much less than $t_{max}$.

E. Time Derivative of the Impulse Function source Problem

If an induction magnetometer is used to detect the field-time variation for the impulse function source, $$\dot{H} = H_I \left( \pi^{-1/2} \cdot \frac{4D}{x^2} \right) \theta^{-5/2} e^{-1/\theta} (\theta^{-1} - 3/2). \quad (18)$$

This $\dot{H}$ has a maximum and a minimum:

$$\dot{H}_{max} = H_I \left( \pi^{-1/2} \cdot \frac{4D}{x^2} \right) \cdot 1.46 \text{ at } \tau = 0.245$$
$$\dot{H}_{min} = H_I \left( \pi^{-1/2} \cdot \frac{4D}{x^2} \right) \cdot (-0.187) \text{ at } \tau = 1.088. \quad (19)$$

F. Sinusoidal Source Functions - Skin Effect

In the case where the source function at $x = 0$ is sinusoidal:

$$H(0, t) = H_o \sin \omega t, \quad (20)$$

the solution for $H(x,t)$ is given by $$H = H_o e^{-\sqrt{\frac{\omega}{2D}}x} \sin (\omega t - \sqrt{\frac{\omega}{2D}}x). \quad (21)$$

The value of $x$ at which $H$ drops to $e^{-1}$ of $H_o$ is called the skin depth, $$x_s = \left( \frac{2D}{\omega} \right)^{1/2} = \left( \frac{2}{\omega \mu \sigma} \right)^{1/2} \quad (22)$$

In addition to the decay of amplitude with increasing frequency and distance, the phase angle relative to that of the driving function advances as $$\sqrt{\frac{\omega}{2D}}x$$

or $x/x_s$. The values of $x_s$ are included in the material parameter listing of Table I.

G. Reflections

Discontinuities in the infinite medium in the one-dimensional case are conveniently discussed in the context of electrical transmission line problems. The analogy with the magnetic diffusion problem is as follows:

$$
\begin{array}{ll}
V \text{ (voltage)} \longrightarrow H & \\
I = \dfrac{1}{R}\dfrac{\partial V}{\partial x} \longrightarrow \dfrac{1}{\sigma}\dfrac{\partial H}{\partial x} & (23) \\
R \text{ (Resistance/length)} \longrightarrow \sigma & \\
C \text{ (Capacitance/length)} \longrightarrow \mu & \\
\qquad = \text{Diffusivity}^{-1} & \\
RC \longrightarrow \mu\sigma &
\end{array}
$$

A short circuit, for instance, may be treated by introducing a source at the point of the short circuit which just cancels the voltage which would have existed, had the line been continuous and infinite. This added voltage source creates the reflection signal which propagates back towards the original source. An open circuit is treated similarly, except that the current rather than the voltage is specified at the discontinuity. For discontinuities in between the short and open circuit conditions, the ratio of voltage to current is specified. Discontinuities having the characteristic impedance, of course, cause no reflections.

H. Source and Transfer Impedances

Continuing with the electrical transmission line analogy, the source and transfer impedances of the line will be modified by discontinuities in the infinite line. Thus, the presence of discontinuities will be detected in the change of source impedance as well as in the change of character of the signal detected by a separate sensor. For sinusoidal source signals, the amplitude and phase of the source and transfer impedances will be modified by reflections.

II. Apparatus

Apparatus for measuring the conductivity of a fluid propagation medium such as salt water is shown in FIG. 1. It will be appreciated from the above discussion that such a measurement is important for detection of electromagnetic anomalies since the conductivity determines the time delay and attenuation parameters.

Figure 2:
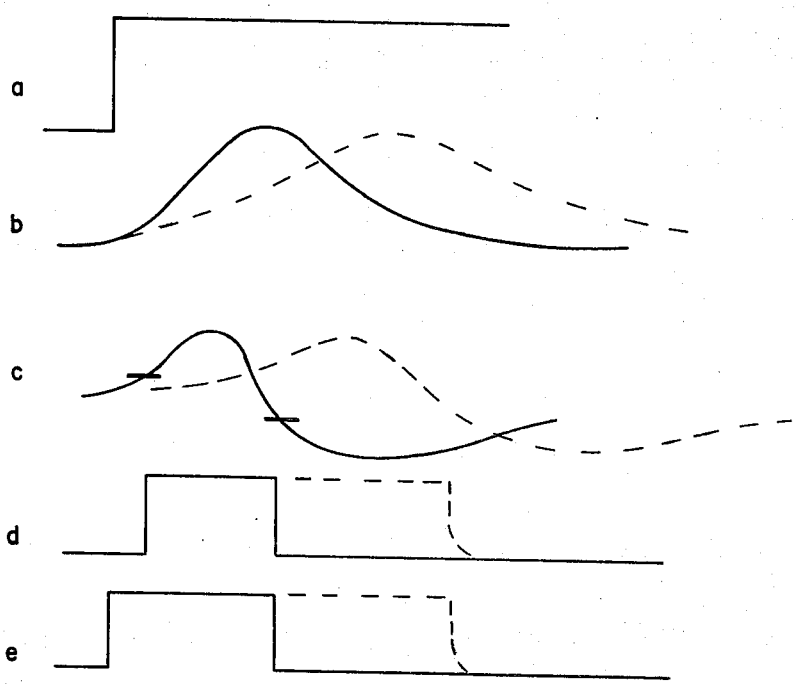
FIG. 2a through 2e are a group of current and voltage waveforms generated in the system of FIG. 1.

In FIG. 1 there is shown a square wave or pulse generator 10 which feeds a transmitting coil 11 with a square wave current waveform such as shown in FIG. 2a. The receiving coil 12 is coaxial with the transmitting coil 11 and is separated from it by several coil diameters. The voltage induced in the receiving coil is shown in FIG. 2b. Differentiation of this coil voltage is accomplished by first passing the induced voltage through amplifier 13 and then through the differentiating pulse shaper 14. The output of the differentiator 14 is the waveform shown in FIG. 2c. This differentiated waveform has a well defined negative going zero crossing at the peak of the receiver voltage B and is therefore more useful as a means of detecting this peak.

The output from differentiator 14 is applied to a Schmitt trigger circuit 15 whose output in turn is applied to a pulsed delay meter flip-flop 16.

The Schmitt trigger circuit is connected so as to be turned off after the negative going zero crossing of the differentiated waveform at its threshold as shown in FIG. 2c. The Schmitt trigger output is shown in the waveform diagram of FIG. 2d.

The bistable flip-flop of the pulse delay meter 16 is turned "on" at the transmitter current positive going step via line 16a and is turned "off" with the negative change at the Schmitt trigger output so that the pulse delay meter waveform of FIG. 2e is obtained. The dotted line curve illustrates a longer delay than the solid line case.

The width of the pulse waveform shown in FIG. 2e which is the output of flip-flop 16 is then proportional to the time delay $\tau$ which is in turn proportional to the conductivity. The conductivity is given by the expression $$\sigma = \frac{6\tau}{\mu x^2} \text{ mhos/meter}$$

where $x$ is the coil spacing in meters, and $\tau$ is the pulse delay in seconds. The permeability, $\mu$, has a value of $4\pi \times 10^{-7}$ for sea water.

If the effects of the negative going step of the transmitter current are suppressed or gated out, the indication meter 17 to which the output from flip-flop 16 is applied may be a simple dc current meter. The average current will then be a function of the pulse widths. If such surpression is not convenient, other well known pulse width indicating circuitry may be used.

A variation of the above described technique is to use a transmitter pulse much narrower than the expected width of the time delay pulse. In this case, the analysis given above indicates that the resulting receiving coil voltage waveform is exactly that of the differentiated waveform shown in FIG. 2c. If this technique is used, less power is required and the need for the pulse shaper differentiating circuit 15 is eliminated.

The amount of surrounding conductive media required for a meaningful measurement to be made is a spherical volume having a diameter several times the length of the coil separation. This is because any boundary effects fall off as the inverse 7th power of the radial distance from the sensor. There is, however, no limitation as to how small the coils may be made provided adequate transmitter power is available.

Figure 3:
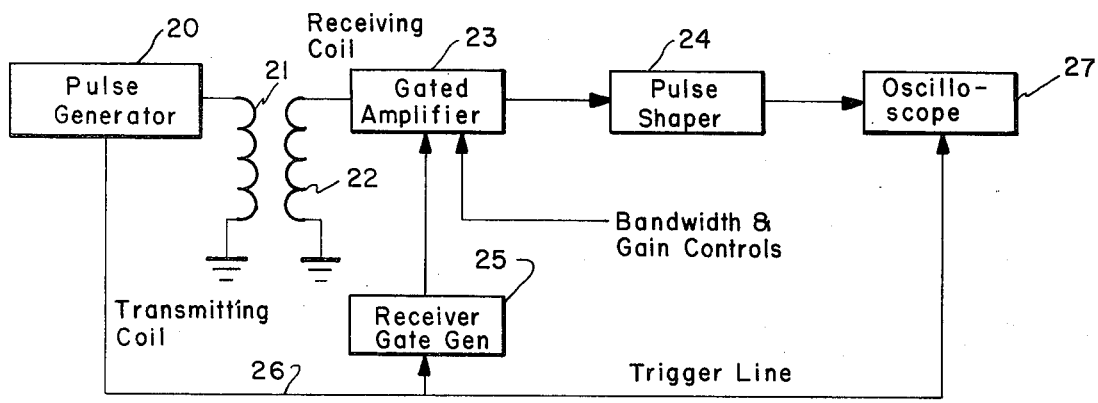
FIG. 3 is a block diagram of a pulsed electromagnetic anomaly detector.

Once having determined the conductivity of the propagation medium of interest, the apparatus shown in FIG. 3 may be used to detect anomalies in the medium. It will be recalled from the theoretical discussion above that in a conducting medium such as sea water or mercury (which may conveniently be used for design or laboratory experiments) magnetic fields from a pulse source propagate in a manner described by the vector diffusion equation 3.

$$\nabla^2 H = \frac{1}{D}\dot{H}$$

where the diffusion coefficient $D$, is defined from the medium permeability, $\mu$, and conductivity, $\sigma$, by the relationship (4)

$$D = \frac{1}{\mu\sigma}.$$

The field at a distance $x$ from a source, therefore is not generated instantly but rather has a time delay of the order of $$\tau = x^2/6D.$$

Anomalies or discontinuities within the conducting medium cause reflections or echoes in a manner analogous to those generated by radar targets. Thus the apparatus shown in FIG. 3 operates essentially as a magnetic field diffusion radar as means of detecting the range as well as the presence of a mine or other object in sea water.

Figure 4A:
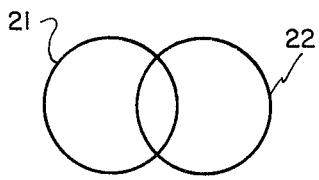
FIGS. 4a, b, c and d are schematic diagrams illustrating coil configurations suitable for use in the system of FIG. 3.
Figure 4B:
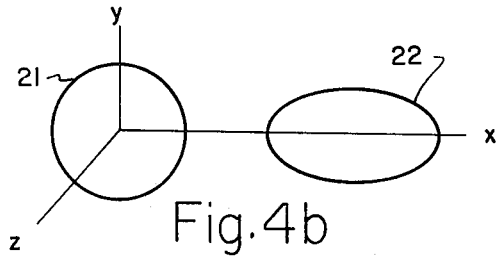
Figure 4C:
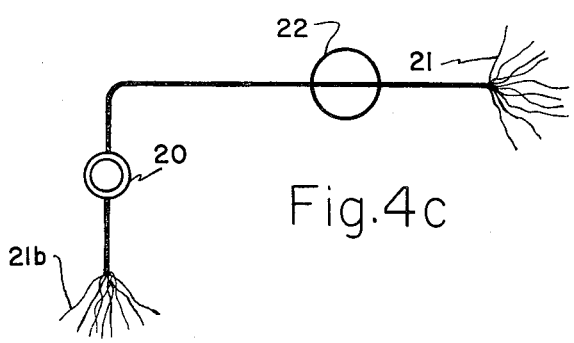
Figure 4D:
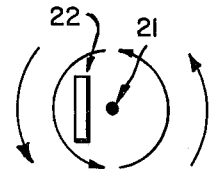
Figure 5:
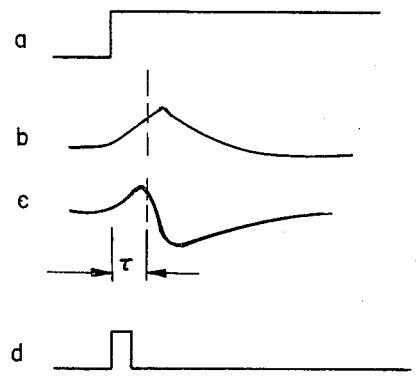
FIGS. 5a, b, c and d are a set of current and voltage waveforms generated in the system of FIG. 3.

In FIG. 3 there is shown a pulse generator 20 which provides a driving current having a waveform as shown in FIG. 5a to the transmitting coil 21. This pulse generator output must be a current step function which rises in a time smaller than the expected time delay, $\tau = x^2/6D$. The receiving coil 22 which is now of course located in proximity to the transmitting coil in a manner to be discussed below detects the rate of change of the magnetic field echo produced by a target. The receiving coil is physically located and oriented to minimize the directly coupled signal from the transmitter coil in one of several ways to be discussed in connection with FIG. 4.

The receiving coil 22 is connected to an amplifier 23 which may be gated in the manner shown in FIG. 3. There it will be noted that the pulse generator 20 in addition to feeding the transmitting coil 21 is also directly connected over trigger line 26 to a receiver gate signal generator 25 which is connected to control the gated receiver amplifier 23. Suitable band width and gain controls are also provided for amplifier 23 in a manner well known in the art. The gating of the receiver amplifier 23 serves to desensitize the receiver during the transmitter current step to minimize feed through effect and to eliminate noise during the inactive period. The band width and gain may be controlled to minimize noise and increase the target detection probability. High gain and narrow band width are used for detection, and lower gain with wider band width for determining range more accurately.

The output of amplifier 23 is applied to the pulse shaper 24 which in turn has its output applied to the oscilloscope 27 or any other convenient display or measuring means.

The transmitter current waveform shown in FIG. 5a is, as noted above, applied to the transmitting coil 21 and causes the propagation of a magnetic field therefrom. The reflected magnetic field from a detected target induces in the receiver coil 22a voltage having the waveform shown in FIG. 5b. Since the voltage waveform shown in FIG. 5b is induced in the receiving coil it follows that the coil is detecting the rate of change of the magnetic field echo produced by the target. The pulse shaper 24 differentiates the receiver coil voltage waveform of FIG. 5b and produces the waveform shown in FIG. 5c which has a narrow positive spike and a broader negative excursion. As was true in the apparatus discussed for simple conductivity measurements, the zero crossing of this waveform also corresponds to the peak of the voltage induced in the receiver coil and therefore provides a much less ambiguous measure of range than would the induced voltage itself.

The receiver gating waveform is shown in FIG. 5b and is the output signal from the gate generator 25. It will be noted that the gate generator is triggered on by the initial positive going leading edge of the transmitter current pulse. The predetermined width of the gate is such as to turn it off before the expected return time.

As noted above, the receiving coil 22 is physically located and oriented to minimize the directly coupled signal from the transmitter coil 21 in one of three ways. In FIG. 4a there is shown schematic representation of the coil 21 being located in a plane parallel to the plane of the coil 22 but offset axially from it as shown. It can be shown theoretically and determined empirically that in such a configuration the magnetic field generated by the transmitting coil will cut the receiving coil in such a fashion that opposite and opposed voltages will be induced in opposite sides of the coil so that no net coupling voltage results.

In FIG. 4b there is shown a schematic representation of an arrangement whereby the coupling is achieved by locating the transmitting and receiving coils orthoganally to each other. Thus, in FIG. 4b, the transmitting coil is represented as being located in the X-Y plane whereas the receiving coil is located in the X-Z plane. In such a configuration none of the flux on the transmitting coil will actually cut the receiving coil since that coil will lie in the plane of propagation of the flux.

A third sensor configuration is shown schematically in FIGS. 4c and 4d. In FIG. 4c the transmitter current from the pulse generator 20 flows down an elongated insulated wire 21 which is straight in configuration and which terminates in an uninsulated end portion within the conducting medium. The other side of the signal generator 20 also has an insulated lead extending from it to the conducting medium and terminating in an uninsulated end portion 21b. The transmitter current flows down the wire and returns to the conducting medium itself to complete the circuit. The receiving coil is placed so that one of its diameters is parallel to the straight wire 21 so that the net direct flux of magnetic field from the transmitter wire is nulled. The advantage of this configuration is that magnetic fields from a long wire drop off as $r^{-1}$ rather than as $r^{-3}$ for coils. Greater range can therefore be achieved for any given power level at the transmitter.

In the theoretical background, introductory discussion above a simplified one-dimensional model was assumed. The theoretical solution of the three-dimensional diffusion equation for boundary conditions as simple as a dipolar source in an infinite medium is not easily obtained. More difficult problems, such as those with one or more reflecting objects in a finite medium are even harder to solve. For these reasons, it is necessary to experimentally calibrate a given system in a selected propagation medium. In order to facilitate such a calibration the basically vector nature of the dipolar magnetic field diffusion problem can be simplified to two one-dimensional scalar experiments by maintaining the sensor orientation to lie along the expected field direction, and by restricting the measurements to the variation of the field along the dipolar equator and pole for known or measured distances. It will then be found that for given conducting mediums measurable time delays in measurable separations can be plotted to attain a calibration curve which can be extrapolated as needed. From such experiments it will be found that the plot of the square root of the maximum time of transmission versus the separation of the coils is nearly a straight line. According to equation 12 in the earlier discussion the slope, $s$, of this line is given by $$t_{max} = s \cdot r$$

where $s = (6D)^{-1/2}$, $r$ = radial separation, and the diffusion coefficient is given by $$D = (6s^2)^{-1}.$$

Figure 7:
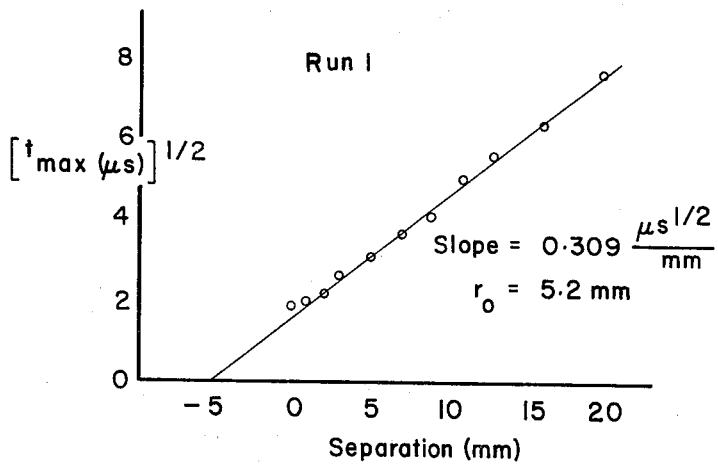
FIG. 7 is a graph of system characteristics.

Any given system can be calibrated by obtaining numerical values for this relationship. A typical set of data is given in FIG. 7.

While the specific preferred embodiment of the invention has been described by way of illustration only, it will be understood that the invention is capable of many other specific embodiments and modifications and is defined solely by the following claims.

What is claimed is:

1. The method of measuring the electromagnetic conductivity of a non-gaseous conductive medium comprising the steps of:
   a. transmitting through said medium an electromagnetic field having a pulse waveform with a stepwise varying energy;
   b. detecting the magnetic component of said electromagnetic field caused by said transmitted pulse;
   c. transforming said magnetic component into an induced voltage;
   d. differentiating said induced voltage, whereby the zero crossing point of the differentiated voltage is a measure of the time of arrival of said magnetic component; and
   e. directly measuring the distance travelled by the transmitted electromagnetic pulse and the time required for the travel of said pulse, thereby to obtain an indication of the conductivity of said medium.

2. The method of determining the location of anomalies of the electromagnetic conductivity of a non-gaseous conductive medium to detect foreign bodies therein, said method comprising the steps of:
   a. measuring the conductivity and permeability of said medium thereby to determine the diffusion coefficient of said medium for the magnetic component of an electromagnetic field propagated therein;
   b. transmitting through said medium an electromagnetic field having a pulse waveform with a stepwise rising leading edge;
   c. detecting the magnetic component reflected from an anomaly in said medium;
   d. transforming the detected magnetic component into an induced voltage;
   e. differentiating said induced voltage, whereby the zero crossing point of the differentiated voltage is indicative of the time of reception of said magnetic component; and
   f. deriving an indication of the distance of said anomaly from the origin of the transmitted wave from the relationship between said diffusion coefficient and the time delay measured between the transmission of the leading edge of said pulse and said time of reception.

3. A detector for detecting an anomaly in a non-gaseous conductive medium comprising:
   a. transmitting means for transmitting through said medium a pulsed electromagnetic field, said transmitting means comprising a transmitting coil, and a pulse generator connected to said transmitting coil;
   b. coil means for receiving a reflected magnetic component of said electromagnetic field to generate an induced voltage, said coil means comprising a receiving coil positioned to have a voltage induced therein by said reflected magnetic component; and
   c. means for deriving from said induced voltage a measure of the time elapsed between transmission of the electromagnetic pulse and reception of said magnetic component reflected by the anomaly, said last referred to means comprising:
   d. a pulse shaper for differentiating said induced voltage and means for measuring the time elapsed between the beginning of the transmitted electromagnetic pulse and the zero crossing point of the differentiated voltage corresponding to the peak of said induced voltage, thereby to obtain an indication of the range of said anomaly.

* * * * *